United States Patent [19]
Lupke et al.

[11] Patent Number: 6,089,851
[45] Date of Patent: Jul. 18, 2000

[54] MOLD BLOCK WITH AIR FLOW CONTROL

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 09/048,088

[22] Filed: Mar. 26, 1998

[51] Int. Cl.[7] .......................... B29C 47/90; B29C 51/36; B29C 51/42
[52] U.S. Cl. ........................ 425/233; 425/326.1; 425/336; 425/384; 425/388; 425/392; 425/396
[58] Field of Search ..................................... 425/233, 325, 425/326.1, 384, 336, 388, 392, 396

[56] References Cited

U.S. PATENT DOCUMENTS

| | | | |
|---|---|---|---|
| 4,226,580 | 10/1980 | Lupke et al. | 425/336 |
| 4,504,206 | 3/1985 | Lupke et al. | 425/336 |
| 4,718,844 | 1/1988 | Dickhut et al. | 425/522 |
| 5,002,478 | 3/1991 | Lupke | 425/336 |
| 5,456,589 | 10/1995 | Lupke | 425/396 |
| 5,624,693 | 4/1997 | Horling et al. | 425/146 |

*Primary Examiner*—Harold Pyon
*Assistant Examiner*—Joseph Leyson

[57] ABSTRACT

A mold block which is used in a moving mold tunnel comprises first and second mold block sections which meet at their parting faces to close the mold block. Each mold block section has a product shaping interior surface and an air movement passage having an entrance at the base of each mold block section, a first opening to the interior surface and a second opening to the parting face of each mold block section. An air flow controller is provided between the parting face opening and the interior surface opening of the passage in the first mold block section and an air flow controller is provided between the entrance and the interior surface opening in the passage in the second mold block section. Through various different positionings of the two air flow controllers, the mold block can be operated in any one of four different modes including a first vacuum forming mode in which air is withdrawn from the mold block through both of the mold block sections, a second vacuum forming mode in which air is withdrawn from the mold block through only one of the mold block sections, a third cooling mode in which air is introduced into the mold block through one of the mold block sections and is then withdrawn from the other of the mold block sections and a fourth blow molding mode in which pressure within the mold block is released through both mold block sections.

7 Claims, 8 Drawing Sheets

MOLD BLOCK WITH AIR FLOW CONTROL

FIELD OF THE INVENTION

The present invention relates to a mold block which is used in a moving mold tunnel and which is particularly useful in the molding of profiled plastic pipe.

BACKGROUND OF THE INVENTION

Corma Inc. of Toronto, Ontario, Canada has for many years been manufacturing and selling plastic pipe molding equipment. This equipment includes mold block sections circulating on endless tracks and meeting with one another to form complete mold blocks which are carried along a moving mold tunnel. The Corma mold blocks feature slit-like openings on the interior surfaces of the mold blocks which provide openings for drawing air out of the mold blocks. These vacuum slit bearing mold blocks have proved extremely efficient in the vacuum forming of plastic pipe where the vacuum has been induced from both mold block sections. They have also, to a lesser extent, been used in the blow molding of pipe.

To date, the Corma mold block has not been used for cooling purposes where it is very important to provide cooling of both the pipe and the mold blocks used in making the pipe. Such cooling substantially increases production speeds of the pipe mold.

SUMMARY OF THE INVENTION

It has now been discovered that by providing air flow controls at specified locations a mold block of the type described above can be used not only as it has been in the past, but for additional purposes as well.

More particularly, a mold block which is used with like mold blocks in a moving mold tunnel comprises first and second mold block sections, each of which has an air movement passage which includes an entrance, a first opening to the product shaping interior surface and a second opening to the parting face of each mold block section. When the two mold block sections are closed with one another at their parting faces, the parting face opening in the first mold block section meets with the parting face opening in the second mold block section.

Also provided are first and second air flow controllers which are movable independently of one another between an air flow and an air blocking position. The first air flow controller is located between the parting face opening and the interior surface opening in the passage in the first mold block section and the second air flow controller is located between the entrance and the interior surface opening in the passage in the second mold block section.

A mold block as described above can be used in any one of four different modes of operation including a first vacuum forming mode in which air is withdrawn from the mold block through both mold block sections, a second vacuum forming mode of operation in which air is withdrawn from the mold block through only one of the mold block sections, a third cooling mode of operation in which air is introduced to the mold block through one mold block section and is withdrawn from the mold block through the other mold block section, and a fourth blow molding mode in which air pressure is released from the mold block through both mold block sections.

In accordance with the present invention, a mold block having air flow controllers as described immediately above, has substantially enhanced versatility over the known Corma mold block.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
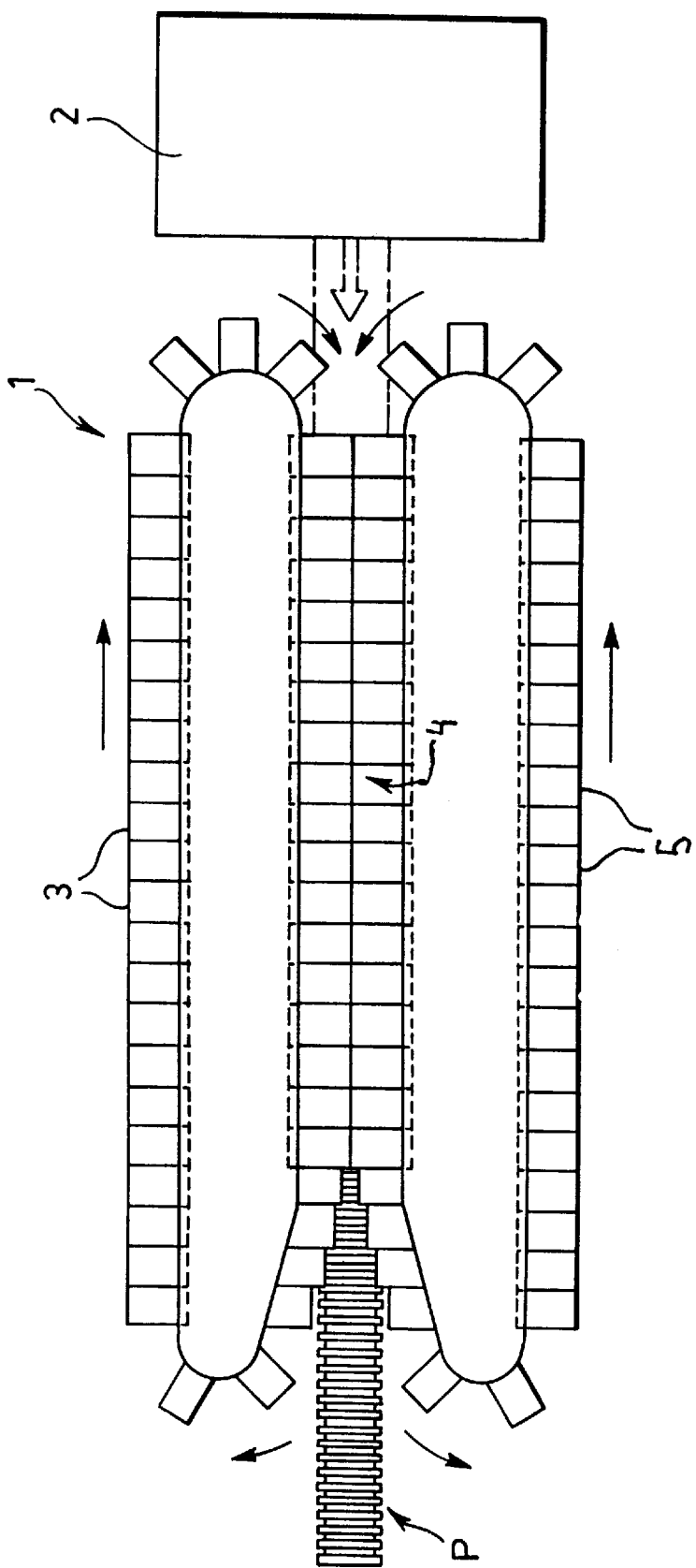
FIG. 1 is a schematic view of a pipe molding apparatus.

FIG. 1 shows a pipe molding apparatus generally indicated at 1. This apparatus comprises an extruder 3 which feeds molten plastic in a downstream direction to a pipe mold for forming profiled pipe generally indicated at P. The pipe mold is formed by upper and lower sets of mold block sections 3 and 5 each of which are carried around an endless track as shown in FIG. 1. Where the mold block sections meet with one another, they form a moving mold tunnel generally indicated at 4.

Figure 2:
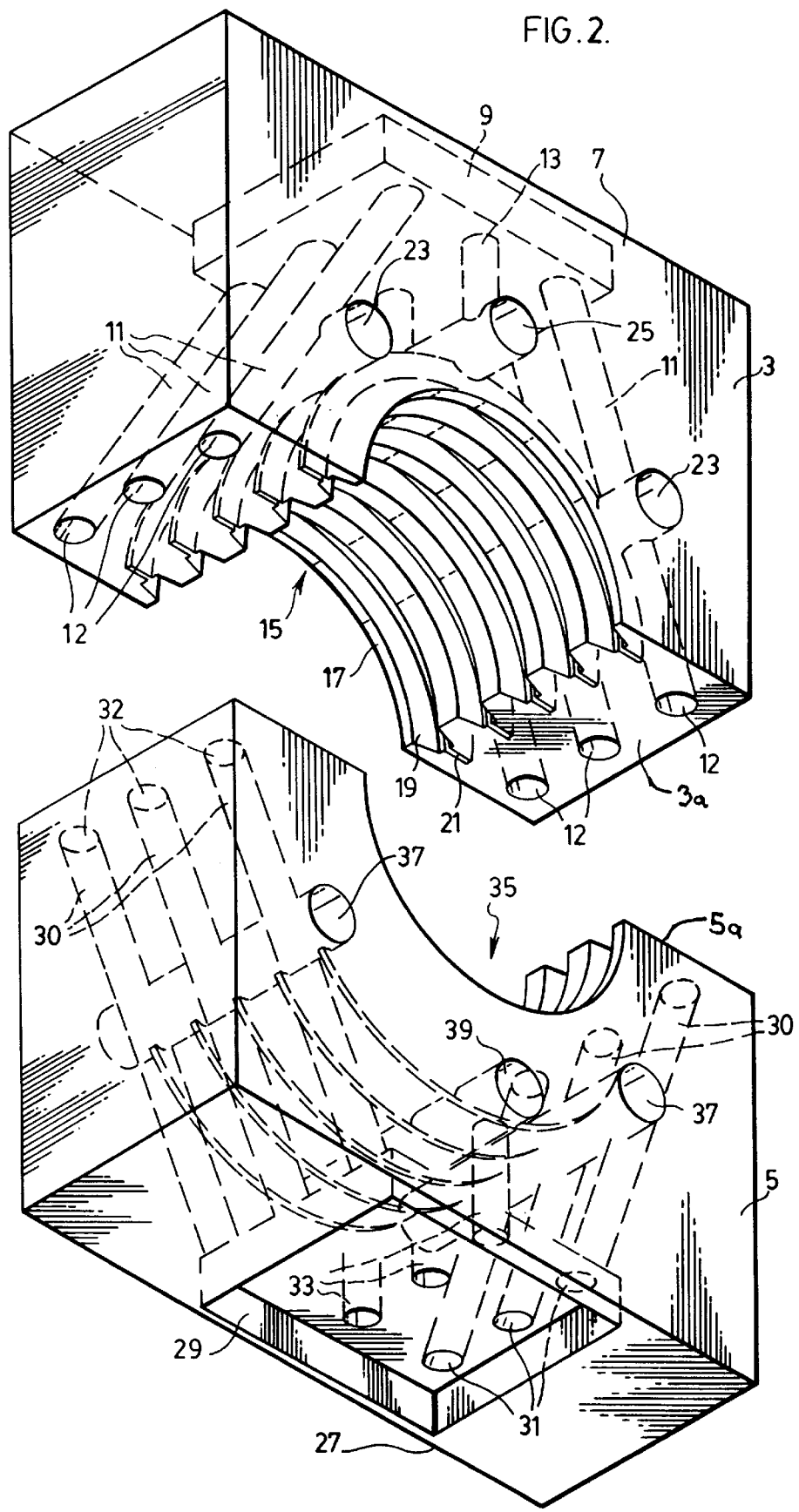
FIG. 2 is an enlarged perspective view of separated mold block sections which meet at their parting faces to form a mold block according to a preferred embodiment of the present invention.

FIG. 2 shows in greater detail the two mold block sections 3 and 5 which meet with one another at their parting faces 3a and 5a respectively to form an entire mold block.

Mold block section 3 has a mounting base 7 which is the region of the mold block which secures to the endless track or to a mold block carrier (not shown) on the endless track. An air manifold 9 is provided in the mounting base of mold block section 3. Manifold 9 is preferably in constant communication through the mold tunnel with an outside source of air pressure which controls or determines the air pressure within the mold block. A similar manifold 29 is provided at the base 27 of mold block section 5.

Returning to mold block section 3, it includes an interior product shaping surface generally indicated at 15. This surface is formed by alternating crests and troughs 17 and 19 respectively. A small slit 21 is provided continuously around each of the semi-circular troughs 19 in surface 15 of mold block 3. More than one slit may be provided in each trough.

Mold block section 5 has an interior surface 35 identical in shape to surface 15 and also provided with slits. The slits in surface 35 mate with the slits in surface 15 to form a series of side by side continuous slits around the circular troughs formed when the two mold block sections meet with one another.

The mold block sections shown in FIG. 2 are used for forming annularly ribbed pipe where the ribs on the pipe are spaced from one another. As will be appreciated, these mold block sections can be replaced by modified mold block sections used for forming helically ribbed pipe in which case, rather than having individual separate slits, there would be one continuous slit helically winding around the interior surface of the mold block.

Mold block section 3 further includes a plurality of air passages 11 through the mold block section. Similar air passages 30 are provided in mold block section 5.

The entrances to the air passages 11 open directly to manifold 9. The air passages then extend through mold block section 3 diverging to opposite sides of the interior product shaping surface 15. The passages extend tangentially of the semi-circular product shaping face and terminate at parting face openings 12.

The air passages 30 in mold block section 5 have entrances 31 at manifold 29 and end openings 32 at the parting face 6 of mold block section 5.

When the two mold block sections close with one another, the parting face openings 32 of passages 30 meet with the parting face openings 12 of passages 11. This then forms a plurality of air channels completely through the mold block.

As will be seen in FIG. 2, there are a plurality of passages to each side of the product shaping interior surface of each mold block section. These passages are separated from one another lengthwise along each mold block section.

Mold block section 3 includes a further set of shorter passages 13 extending from manifold 9 radially of mold block section 3. A similar set of short passages 33 is provided extending from manifold 29 in mold block section 5.

Mold block section 3 includes a pair of bores 23 and a further bore 25 through the mold block section. Similar bores 37 and 39 are provided through mold block section 5. Each of these bores opens to the slits formed in the interior surfaces of the two mold block sections. In mold block section 3, passages 11 open onto bores 23 and passages 13 open onto bore 25.

In mold block section 5, passages 30 open onto bores 37 while passages 33 open onto bore 39.

As will be understood from the above in mold block section 3, each of the passages 11 has openings at the manifold 9, at the bore 23 and at the parting face of mold block section 3. Passages 13 have openings at the manifold 9 and at the bore 25. The bores 23 and 25 provide air paths from the passages 11 and 13 respectively to the slits in the interior surface of mold block section 3. A similar set up is found in mold block section 5, where passages 30 have openings at manifold 29, at bores 37 and at the parting face of mold block section 5. The bores 37 and 39 provide direct air paths for passages 30 and 33 to the slits provided in the interior surface 35 of mold block section 5.

The key to the present invention lies in the provision of air flow controls which dictate the movement of air in the mold block formed by mold block sections 3 and 5. FIGS. 3 through 6 of the drawings show the provision of these air flow controllers and the positions that they can assume to provide various different modes of operation of the mold block.

Figure 7:
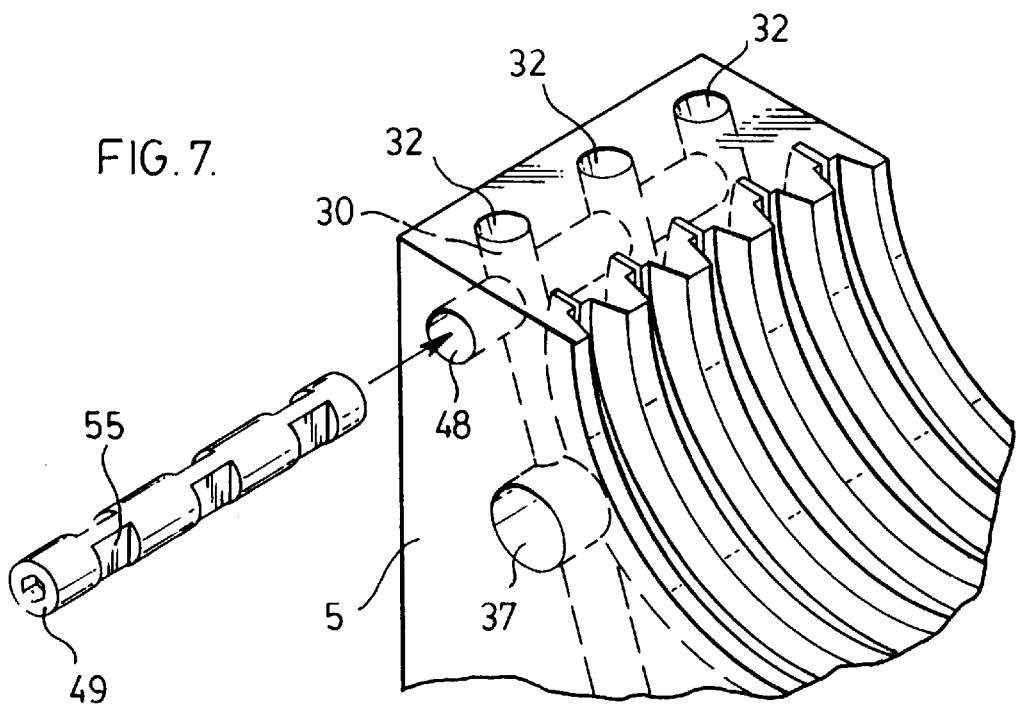
FIG. 7 is a perspective view of the air flow control region of one of the mold block sections of FIG. 2 and also showing a specific type of air flow controller usable in the air flow control region according to a preferred embodiment of the present invention.

FIG. 7 of the drawings shows that the lower mold block section 5 is provided with a further bore 48 which penetrates through the spaced apart air passages 30. Bore 48 is provided between bore 37 and parting face openings 32 of passages 30.

Although FIG. 7 only shows one side of mold block section 5, the other side of the mold block section has the identical setup.

Figure 8:
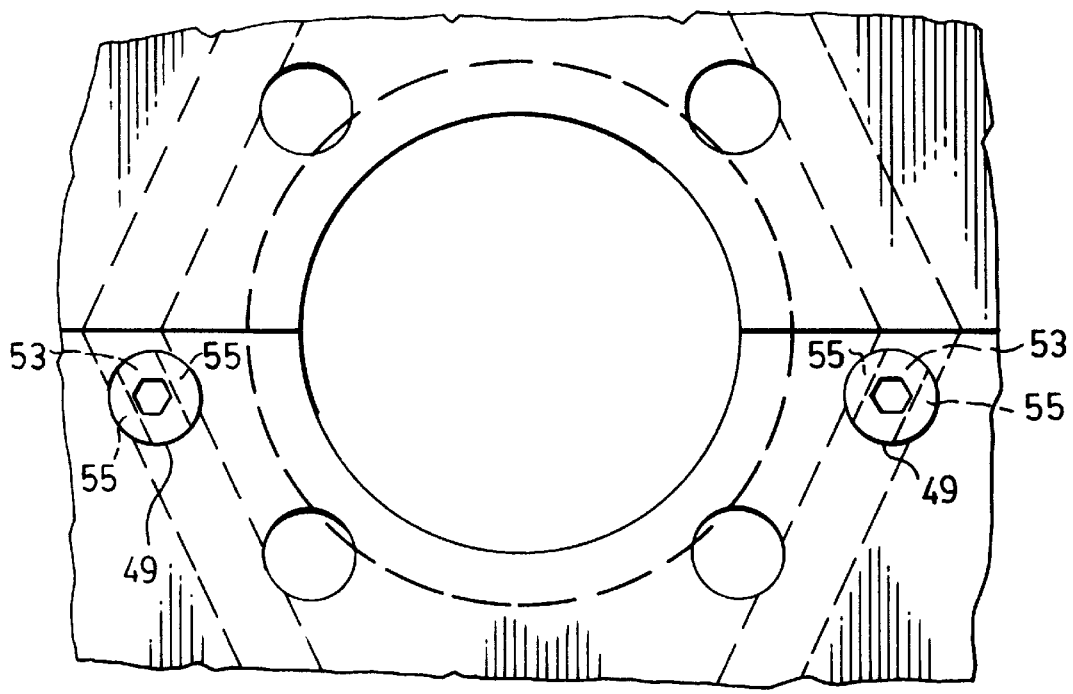
FIGS. 8 and 9 are sectional views through a simplified mold block showing different positions of operation of the air flow controller of FIG. 7.
Figure 9:
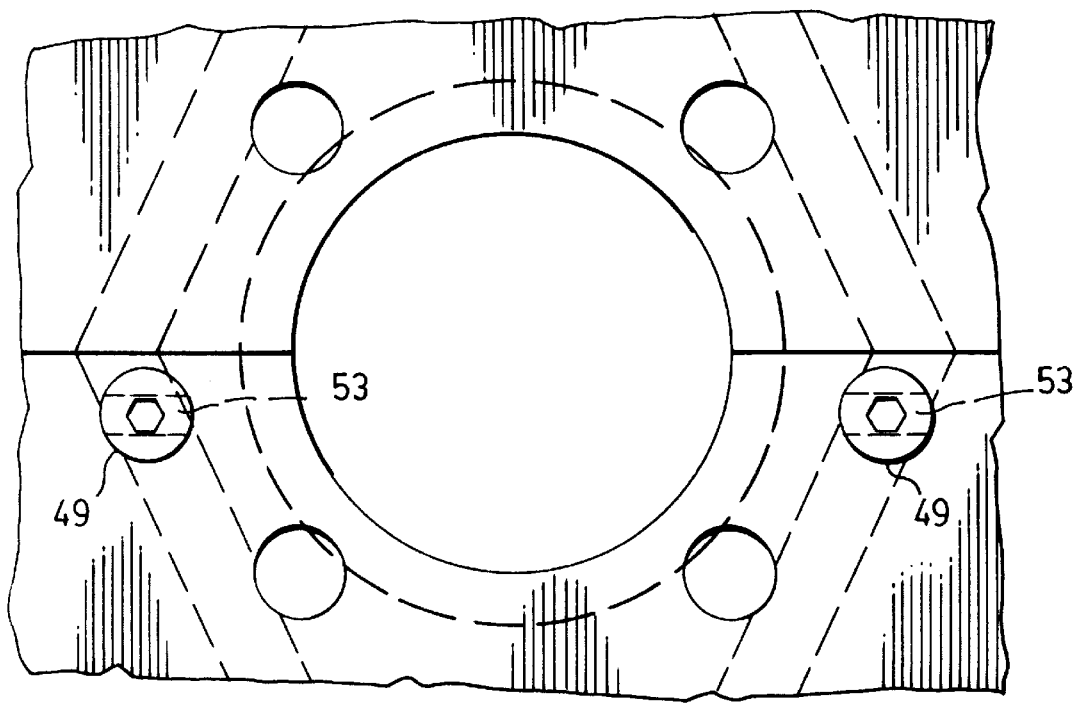

A rotary valve 49 fits into bore 48 extending across all of the air passages 30. Valve 49 has a maximum diameter the same as the inside diameter of bore 48. The valve is provided with a series of flats 55 along its length and each one of these flats is located in one of the air passages 30. As will be seen in FIG. 8, the valve can be set with its flats parallel to the longitudinal axis of passage 30 to allow air to flow past the valve or it can be turned 90° from the FIG. 8 to the FIG. 9 position where the valve blocks air flow through the passages.

Similar valves 45 are provided in passages 11 and passages 13 of mold block section 3. However, these valves are located between the upper ends of passages 11 which open onto manifold 9 and bores 23 through which the passages 11 pass. The operation of valves 45 is identical to the operation of valves 49. However, it should be noted that the valves 45 and 49 will be operated independently of one another.

Figure 7A:
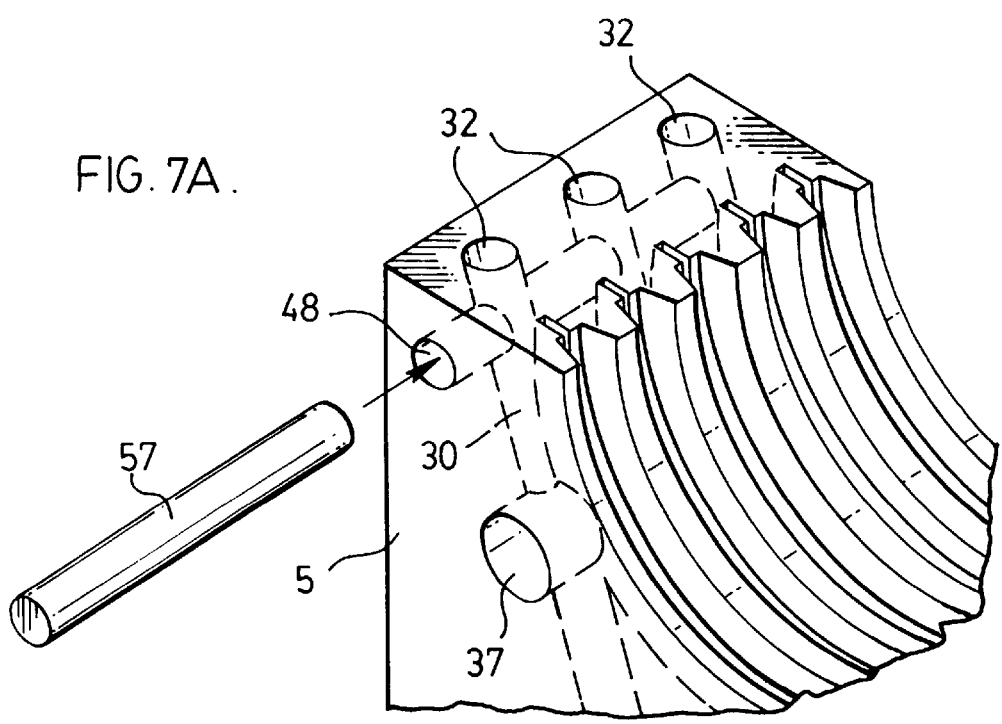
FIG. 7a is a view similar to FIG. 7 showing an alternate form of an air flow controller according to a further preferred embodiment of the present invention.

FIG. 7a shows an alternate type of valve 57 which is nothing more than a plug which is removed from bore 48 of mold block section 5 to allow air to move in both directions through passages 30. However, when the plug is inserted into bore 48, it blocks the movement of air through the passages.

Either of the above types of valves is easily workable with the mold block sections with valve 49 having the benefit that it does not need to be removed but simply can be turned preferably by using the tool receiving head 51 of the valve.

The mold block as described above is usable in a number of different modes of operation. Some of these modes of operation are shown in FIGS. 3 through 6.

Figure 3:
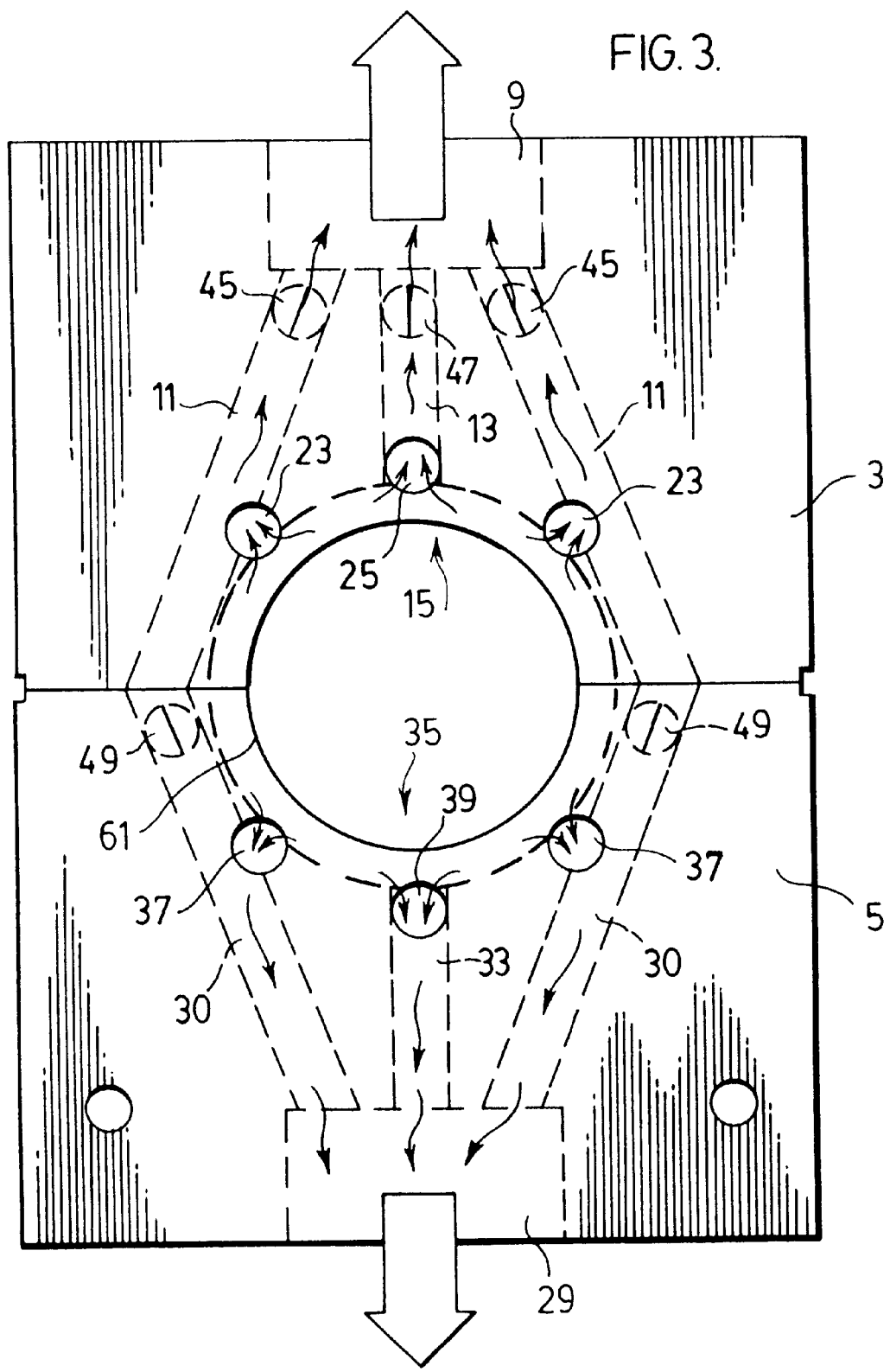
FIGS. 3 through 6 are sectional views through the mold block formed by the mold block sections of FIG. 2 showing the various different modes of operation of the mold block.

Referring specifically to FIG. 3, it will be seen that by keeping both the the of the valves 45 and 49 open and by subjecting the manifolds 9 and 29 of the mold block sections 3 and 5 respectively to vacuum, air is drawn along the slits in the interior faces of the two mold block sections out of the upper mold block section 3 through the bores 23 and 25 and also out of the lower mold block section 5 through the bores 37 and 39. Therefore, in this mode of operation vacuum is drawn through both mold block sections.

Figure 4:
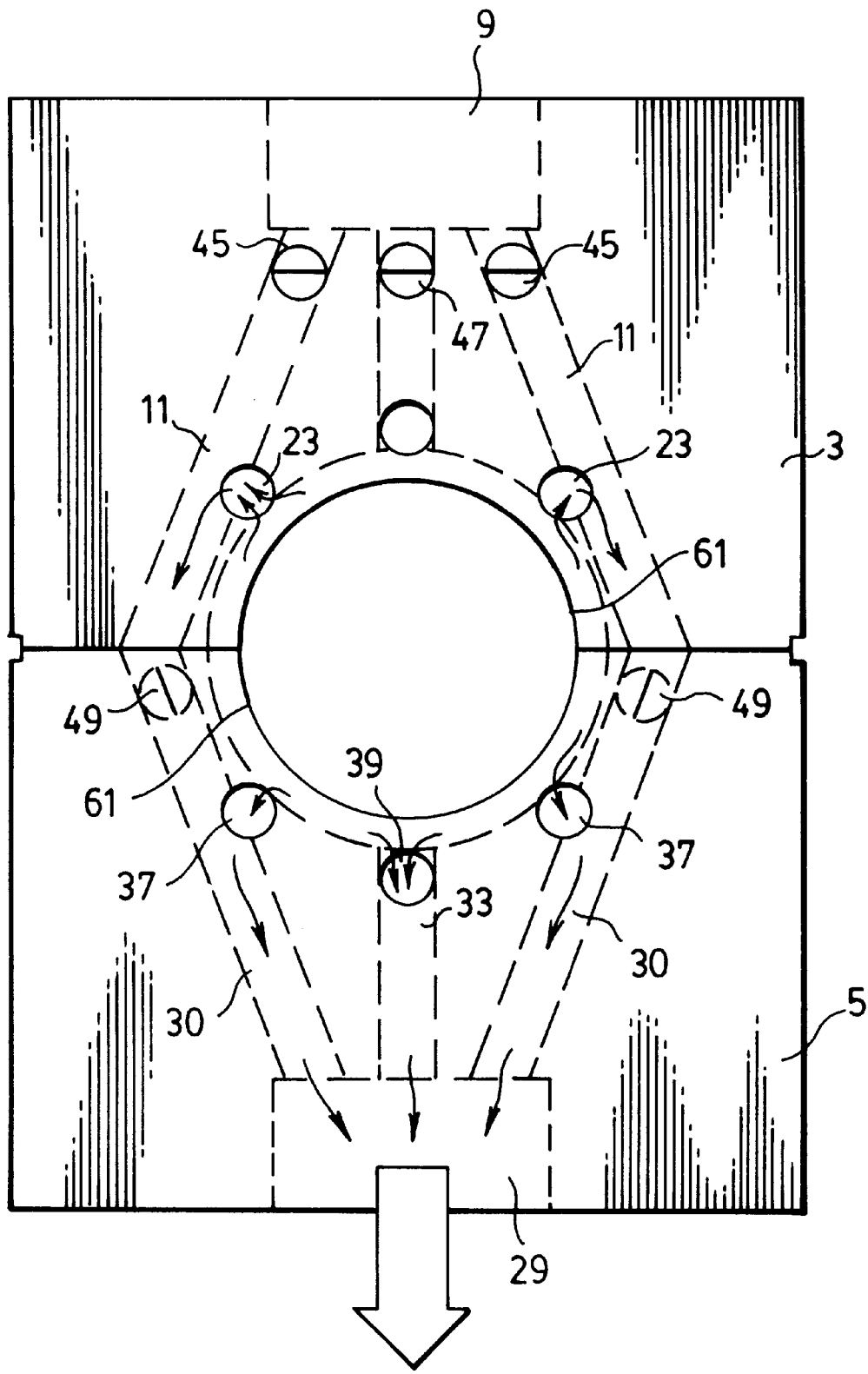

FIG. 4 of the drawings shows a situation in which valves 45 are closed and valves 49 remain open. Manifold 29 of the lower mold block section 5 is subject to vacuum and the air is drawn out of the mold block as indicated by the arrows in FIG. 4 from the lower mold block section only. However, it should be noted that because of the mating of the parting face openings of the air passages in the upper and the lower mold block sections, some of the air is initially drawn out from the mold cavity through not only the bores in the lower mold block section but also from bores 23 in the upper mold block section. Therefore, even though the vacuum is only applied from the lower mold block section, the upper mold block section is still subject to the vacuum ensuring even distribution of the plastic parison 61 which is used to form the pipe completely around the interior surface of the cavity within the mold block.

The mold block of FIG. 4 has the benefit that it does not need to be used with a molding apparatus having vacuum features on both sides of the mold tunnel, but rather only requires that vacuum systems need only be provided on one side of the mold tunnel substantially reducing costs of the overall molding apparatus.

Figure 5:
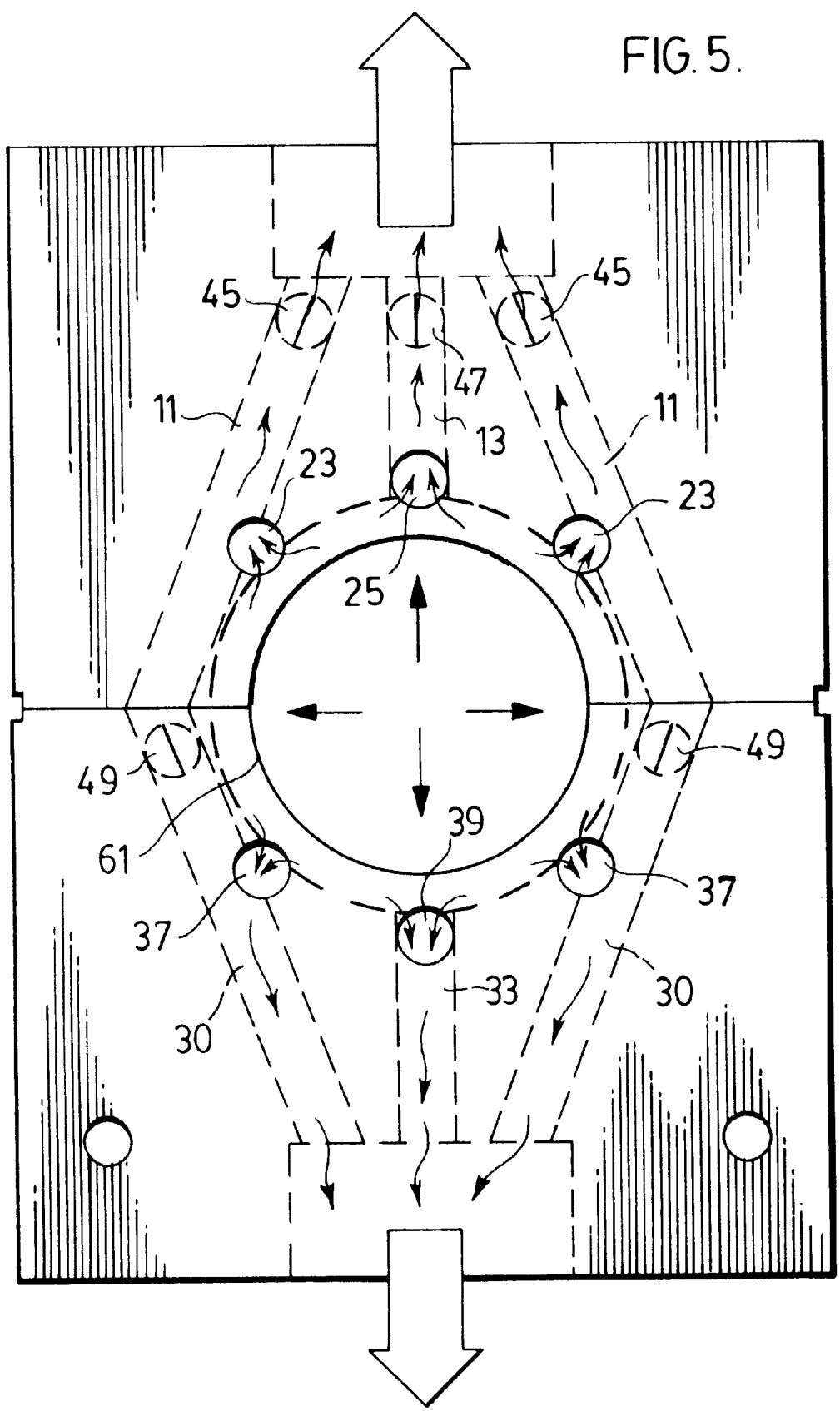

In the FIG. 5 arrangement, it will be seen that rather than using vacuum forming, blow molding as indicated by the arrows inside of parison 61 can be used to force the parison outwardly onto the interior surfaces of the mold block sections. In this case, like the setup in FIG. 3, all of the valves are left in the air flow position which enables air trapped between the parison and the interior surface of the mold block to be released outwardly through all of the air passages.

Figure 6:
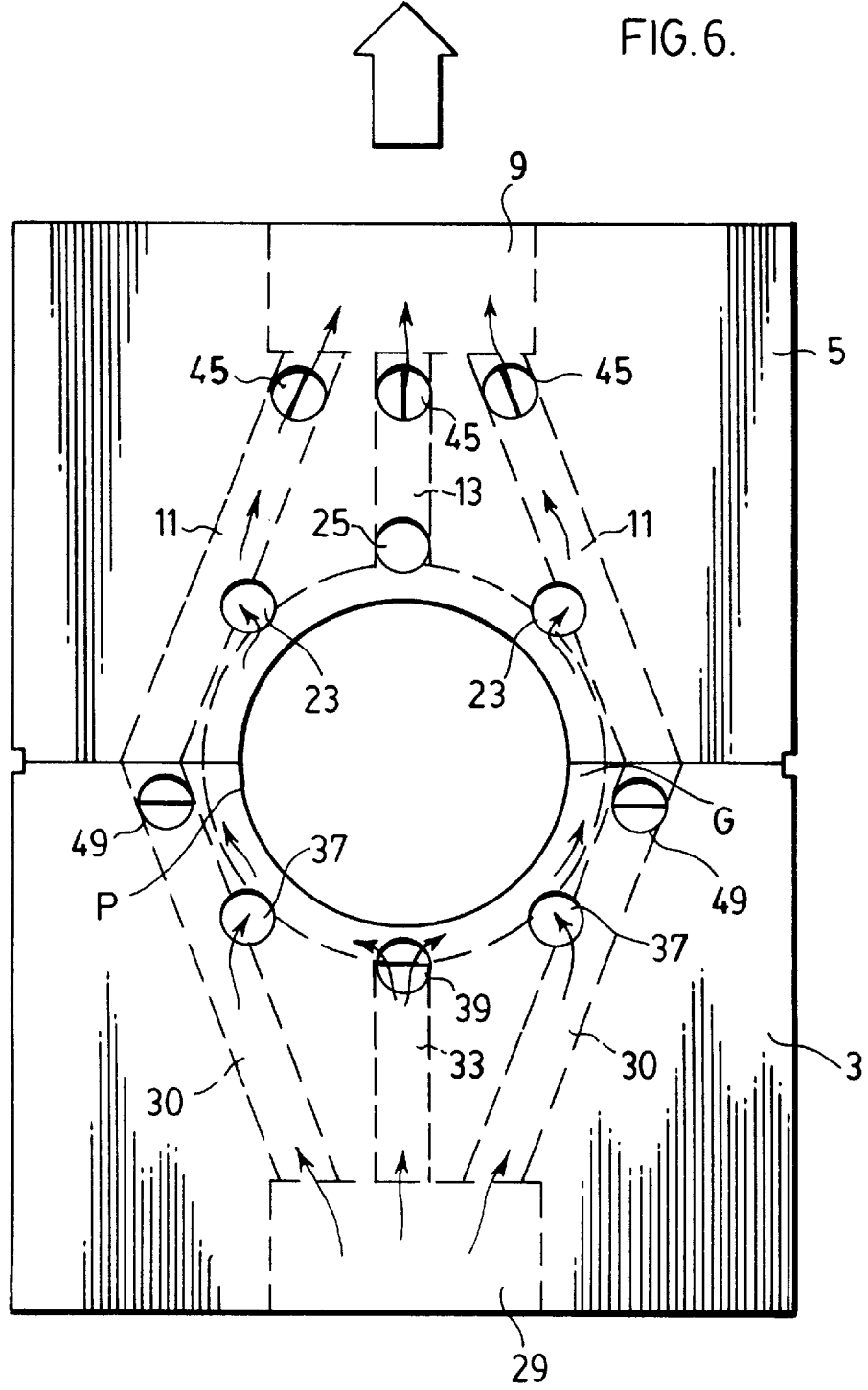

FIG. 6 shows a mode of operation of the mold block which is very unique and beneficial. This mode of operation is used for cooling of both the pipe within the moving mold tunnel as well as the mold block sections as they move along the mold tunnel.

More specifically, in my copending application, I describe how after the pipe is initially shaped within the mold tunnel using any one of the formation methods of FIGS. 3 through 5, there will tend to be shrinkage of the pipe away from the interior wall surfaces of the mold block sections. This occurs while the pipe is still in the mold tunnel. As a result, a gap G is produced between the formed pipe and the interior wall surface of the mold block. The setup of FIG. 6 takes advantage of this pipe shrinkage to provide enhanced cooling of both the pipe and the mold block sections.

More specifically, valves 49 in the lower mold block section 5 are set to the air blocking position whereas all of the valves in the upper mold block section are set in the air flow position. Air, which may be ambient air or chilled air, is taken from outside of the lower mold block section 5, is introduced from the base of the lower mold block section and along the channels 30 and 33 into the gap G through the bores 37 and 39 respectively. This air then flows around the pipe in the gap G and is withdrawn at bores 23 and 25 out of mold block section 3, the manifold 9 of which is subject to vacuum. Valves 49 being in the blocking position prevent the cooling air from being drawn directly through the mold block without going around the pipe.

The cooling air not only has a cooling effect on the pipe but additionally has a cooling effect on each of the mold block sections initially as it passes through mold block section 5 and then later as it is withdrawn through mold block section 3.

Although various preferred embodiments of the present invention have been described in detail, it will be appreciated by those skilled in the art, that variations may be made without departing from the spirit of the invention or the scope of the appended claims.

The embodiments of the invention in which an exclusive property or privilege is claimed are defined as follows:

1. A mold block for use in a moving mold tunnel, said mold block comprising first and second mold block sections each of which has a product shaping interior surface and a parting face, each mold block section further having an air movement passage therein with said passage having an entrance, a first opening to the product shaping interior surface and a second opening to the parting face, the second opening of the passage in the first mold block section being in communication with the second opening of the passage in the second mold block section when the mold block sections are closed at their parting faces with one another, and first and second air flow controllers movable independently of one another between an air flow and an air blocking position, said first air flow controller being located between the first and the second opening in the passage in the first mold block section, and the second air flow controller being located between the entrance and the first opening in the second mold block section.

2. A mold block as claimed in claim 1, wherein each mold block section has a plurality of spaced apart slit portions in the interior surface thereof, the slit portions in the first mold block section aligning with the slit portions in the second mold block section, the first opening communicating with the slit portions in each mold block section.

3. A mold block section as claimed in claim 1, wherein each mold block section has a mounting base with the entrance to the air movement passage being located at the mounting base of each mold block section.

4. A mold block usable with other like mold blocks in forming a moving mold tunnel, said mold block comprising first and second mold block sections each of which has a mounting base and a parting face to opposite sides of each mold block section, the mold block sections closing with one another at their parting faces, each mold block section further having an air manifold at its base, a product shaping interior surface having an air movement slit extending thereacross, first and second air passages through each mold block section, each air passage having a manifold opening, a parting face opening and a slit opening between the manifold opening and the parting face opening, the slit openings of the first and second air passages of each mold block section being spaced from one another to opposite sides of the interior surface of each mold block section, the parting face openings of the first and second air passages in the first mold block section mating respectively with the parting face openings of the first and second air passages in the second mold block section when the mold block sections are closed with one another to form first and second air channels through the mold block, a first air flow controller between the parting face opening and the slit opening in each of the first and second air passages in the first mold block section, and a second air flow controller between the manifold opening and the slit opening in each of the air passages in the second mold block section, all of said air flow controllers being moveable between an air blocking and an air flow setting with the first air flow controllers being correspondingly settable with one another independently of the second air flow controllers which are also correspondingly settable with one another to enable operation of said mold block in any one of four different modes including a first vacuum forming mode in which air is withdrawn from the mold block through both mold block sections, a second vacuum forming mode in which air is withdrawn from the mold block only through the first mold block section, a third cooling mode in which air is introduced to the mold block through the second mold block section and drawn out of the mold block through the first mold block section and a fourth blow molding mode in which air pressure is released from the mold block from both mold block sections.

5. A mold block as claimed in claim 4, wherein the interior product shaping surface of each mold block section has a semi-circular configuration and wherein said first and second air passages diverge from one another from the base to the parting face and extend tangentially along the interior product shaping surface of each mold block section.

6. A mold block as claimed in claim 5, wherein each of said mold block sections include a third air passage located between said first and second air passages, said third air passage opening at one end to the air manifold and opening at the other end to the air movement slit in the product shaping interior surface of each mold block section, and a third air flow controller which is also movable between an air blocking and an air flow setting in the third air passage of the second mold block section.

7. A mold block for use in making profiled plastic pipe in a moving mold tunnel formed by said mold block and other like mold blocks, said mold block comprising first and second mold block sections each of which has a pipe shaping interior surface comprising alternating crests and troughs and at least one air movement slit in the interior face along each trough, a parting face and a mounting base to opposite sides of each mold block section, a set of first air passages and a set of second air passages in each mold block section, the first air passages being spaced from one another and the second air passages being spaced from one another lengthwise of each mold block section, each passage having an entrance at the base and an open end at the parting face of the mold block section in which each passage is located, the first and second passages diverging from one another to opposite sides of the interior surface of each mold block section, a first and second longitudinal bore in each mold block section, the first longitudinal bore providing a path from the set of first air passages and the second longitudinal bore providing a path from the set of second air passages to the air movement slits in each mold block section, the open ends of the first passages in the first mold block section meeting with the open ends of the first passages in the second mold block section and the open ends of the second passages in the first mold block section meeting with the open ends of the second passages in the second mold block section when the mold block sections close with one another at their parting faces, and air control means in each of the passages, the air control means being settable in an air flow and in an air blocking position, the air control means in the passages in the first mold block section being located between the open ends thereof and the bores in the first mold block section and the air control means in the passages in the second mold block section being located between the entrances thereof and the bores in the second mold block section, the air control means in the first set of passages in each mold block section comprising a single elongated valve which extends therebetween and the air control means in the second set of passages in each mold block section also comprising a single valve which extends therebetween.

* * * * *